United States Patent [19]
Karttunen

[11] Patent Number: 6,023,760
[45] Date of Patent: Feb. 8, 2000

[54] MODIFYING AN INPUT STRING PARTITIONED IN ACCORDANCE WITH DIRECTIONALITY AND LENGTH CONSTRAINTS

[75] Inventor: Lauri J. Karttunen, Meylan, France

[73] Assignee: Xerox Corporation, Stamford, Conn.

[21] Appl. No.: 08/857,942

[22] Filed: May 16, 1997

[30] Foreign Application Priority Data

Jun. 22, 1996 [GB] United Kingdom .................. 9613141

[51] Int. Cl.⁷ ................................................. G06F 17/20
[52] U.S. Cl. ................................. 712/300; 704/9; 704/10
[58] Field of Search ............................... 395/898; 704/2, 704/9, 10; 707/6; 341/55; 712/300

[56] References Cited

U.S. PATENT DOCUMENTS

| | | | |
|---|---|---|---|
| 5,325,091 | 6/1994 | Kaplan et al. ............................. | 341/51 |
| 5,410,475 | 4/1995 | Lu et al. ................................... | 704/1 |
| 5,426,779 | 6/1995 | Chambers, IV ............................ | 707/6 |
| 5,450,598 | 9/1995 | Kaplan et al. ............................. | 707/533 |
| 5,511,159 | 4/1996 | Baker et al. ............................... | 345/326 |
| 5,594,641 | 1/1997 | Kaplan et al. ............................. | 707/1 |
| 5,625,554 | 4/1997 | Cutting et al. ............................ | 707/100 |
| 5,721,939 | 2/1998 | Kaplan ..................................... | 704/9 |
| 5,754,847 | 5/1998 | Kaplan et al. ............................. | 707/100 |

FOREIGN PATENT DOCUMENTS

| | | |
|---|---|---|
| 0 083 393 A2 | 7/1983 | European Pat. Off. . |
| 0 093 250 A2 | 11/1983 | European Pat. Off. . |
| 0 233 996 A2 | 9/1987 | European Pat. Off. . |
| 0 415 000 A2 | 3/1991 | European Pat. Off. . |
| 2 235 557 | 3/1991 | United Kingdom . |
| WO 88/05193 | 7/1988 | WIPO . |

OTHER PUBLICATIONS

Roche, E., "Analyse syntaxique transformationelle du francais par transducteurs et lexique–gramaire", Doctoral Dissertation, Universite Paris 7, 1993, pp. 136–156.

Silberztein, M., 'Dictionnaires Electroniques et Analyse Automatique de textes—Le Systeme Intex', Masson, Paris, France, 1993, pp. 154–167.

Schüzenberger, M.P., "Sur Une Variante Des Fonctions Squentielles," Theoretical Computer Science, 4, 1977, pp. 47–57.

Kempe, A., and Karttunen, L., "Parallel Replacement in Finite State Calculus", Proceedings of the Sixteenth International Conference on Computational Linguistics, Coling 96, 1996.

Karttunen, L., "Constructing Lexical Transducers", Proceedings of the Fifteenth International Conference on Computational Linguistics, Coling 94, 1994, pp. 406–411.

Horowitz, P., and Hill, W., *The Art of Electronics,* Second Ed., Cambridge: Cambridge University Press, 1989, pp. 673–678.

Mohri, M., "On Some Applications of Finite–State Automata Theory to Natural Language Processing", AT&T Bell Laboratories, Apr. 18, 1996.

Berstel, Dr. Jean. Transductions and Context–Free Languages, B.G. Teubner Stuttgart, Germany, 1979, pp. 77–80, 92–110, 114–123.

(List continued on next page.)

*Primary Examiner*—Kenneth S. Kim

[57] ABSTRACT

A processor implemented method of modifying a string of a regular language, which includes at least two symbols and at least two predetermined substrings. Upon receipt of the string, the processor determines an initial position within the string of a substring matching one of the preselected substrings. To make this determination, the processor either matches symbols of the string starting from the left and proceeding to the right or by starting from the right and proceeding to the left. After identifying the initial position, the processor then selects either the longest or the shortest of the preselected substrings. The processor then replaces the matching substring with the string of the lower language associated with the selected preselected substring and outputs the modified string.

20 Claims, 10 Drawing Sheets

TABLE I — DIRECTED REPLACEMENT SYMBOLS

| DIRECTION OF MATCH | LENGTH OF MATCH | |
|---|---|---|
| | longest match | shortest match |
| left - to - right | @-> | @> |
| right - to - left | ->@ | >@ |

OTHER PUBLICATIONS

Chanod, Jean–Pierre and Pasi Tapanainen. "Tagging French–Comparing a Statistical and a Constraint–Based Method," In The Proceedings of the Seventh Conference of the European Chapter of the Association for Computational Linguistics, Dublin, Ireland, 1995, pp. 149–156.

Eilenberg, Samuel.. Automata, Languages, and Machines: Volume A, Academic Press, New York, 1974, pp. 266–295.

Gross, Maurice. "The Use of Finite Automata in the Lexical Representation of Natural Language," In Lecture Notes in Computer Science, Springer–Verlag, Berlin, Germany, 1989, pp. 34–50.

Hopcroft, John E. and Jeffrey D. Ullman. Introduction to Automat Theory, Languages, and Computation. Addison–Wesley Publishing Company, Inc., Menlo Park, CA, 1979, pp. 1–2 and 28–35.

Kaplan, Ronald M. and Martin Kay. "Regular Models of Phonological Rule Systems," Computational Linguistics, vol. 20, No. 3, 1994, pp. 331–378.

Karttunen, Lauri et al. "A Compiler for Two–Level Phonological Rules," In Report No. CSLI–87–108. Centre for the Study of Language and Information, Stanford University. Palo Alto, California, 1987, pp. 1–51.

Karttunen, Lauri. "The Replace Operator," In The Proceedings of the 33rd Annual Meeting of the Association for Computational Linguistics, ACL–94, Boston, Massachusetts, 1995,. pp. 16–23.

Roche, Emmanuel and Yves Schabes. "Deterministic Part–of–Speech Tagging with Finite–State Transducers," Computational Linguistics, vol. 21, no. 2, 1995, pp. 227–253.

Schutzenberger, M.P. "Sur Une Variante Des Fonctions Sequentielles," Theoretical Computer Science, 4, 1977, pp. 47–57 (In French).

Silberztein, Max. Dictionnaires Electoniques et Analyse Automatique de Textes, Masson, Paris, France, 1993, pp. 154–167 (In French).

TABLE I

| DIRECTED REPLACEMENT SYMBOLS | | |
|---|---|---|
| | LENGTH OF MATCH | |
| DIRECTION OF MATCH | longest match | shortest match |
| left - to - right | @-> | @> |
| right - to - left | ->@ | >@ |

UPPER' = UPPER/[%^] - [?* %^]
UPPER" = UPPER/[%<|%>] - [? *[%<|%>]]

FIG. 12

110 — Initial match
  ~$[ %^ |%< | %> ]
      .o.
  [. .] -> %^ ||_UPPER
      .o.
112 — Left to right
  [ [~$[%^] [%^ :%< UPPER' 0:%>] ]*
    ~$[%^] ]
      .o.
  %^ -> [ ]
      .o.
114 — Longest match
  ~$[%< [UPPER' ' & $[%>] ] ]
      .o.
116 — Replacement
  [ ~$[%<] [ [%< UPPER %>] .x. LOWER] ]*
    ~$[%<]    ;

Insertion
[ ~$[%<] [%< .x. PREFIX]
  UPPER    [%> .x. SUFFIX] ] *
  ~$[%<]        ;

120 — WHITE%_SPACE+ @-> SPACE
        .o.
      [ LETTER+ |
122 ⎰  at% least|
    ⎱  head% over% heels|
       in% spite% of]
       @-> ... END%_OF%_TOKEN
124 —     .o.
      SPACE -> [] || .#. | END%_OF%_TOKEN _ ;

MODIFYING AN INPUT STRING PARTITIONED IN ACCORDANCE WITH DIRECTIONALITY AND LENGTH CONSTRAINTS

FIELD OF THE INVENTION

The present invention relates to text processing. More particularly, the present invention relates to a processor implemented method of finding and modifying strings of a regular language.

BACKGROUND OF THE INVENTION

Figure 1:
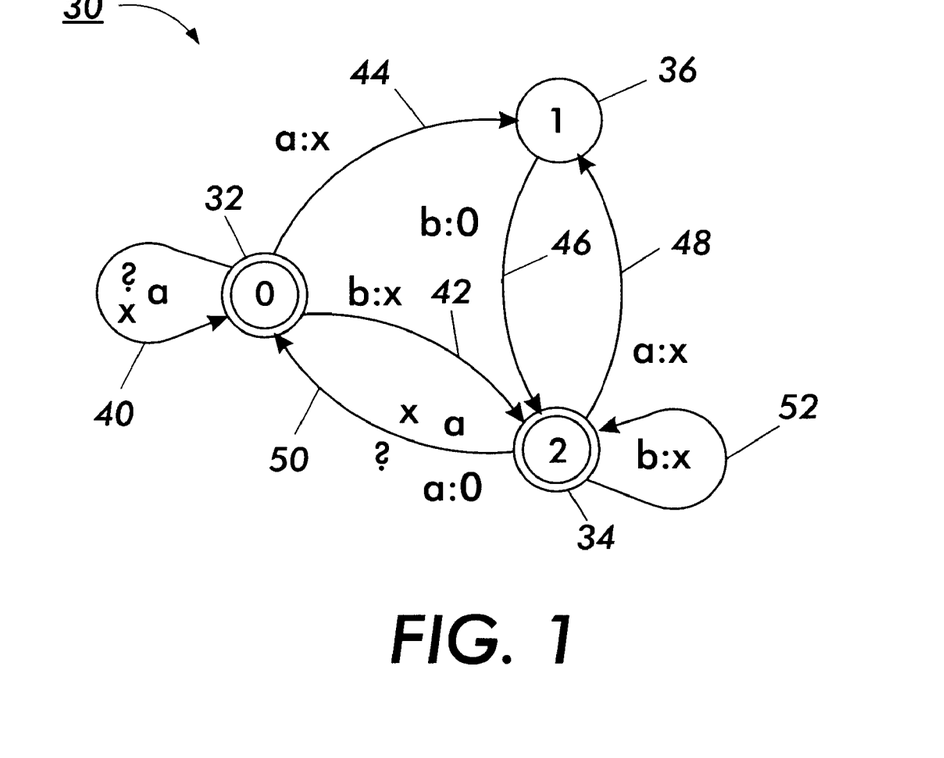
FIG. 1 illustrates a known replacement transducer representing a b|b|b a|a b a →x.

Many applications within the field of text processing involve replacing a string in one language with one or more elements from a second language. Typically, the language of the input string is denoted "UPPER," while the language of the output string is denoted "LOWER." (Note that UPPER and LOWER are not necessarily two different natural languages.) For example, one application reduces the amount of memory required to store a text by inserting tags within the text so that all the text appearing between the tags appears or disappears without changing the text in any other way. Generally, finite state transducers are used to replace a string in UPPER with a string in LOWER. Finite state transducers replace a string of a regular language with regular expressions. As used herein, a language is regular if it can be parsed by a finite state machine into a string of regular expressions. For a more technical definition of "regular language" see J. Hopcroft & J. Ullman, *Introduction to Automata Theory, Languages, and Computation,* 1979. Unfortunately, finite state transducers compiled from simple replace expressions are generally nondeterministic. The illustration of FIG. 1 aids the explanation of why nondeterministic finite state transducers pose a problem. Discussion of FIG. 1 is, in turn, aided by a brief review of regular expression formalisms and notational conventions. The formalisms and notational conventions used herein are essentially those described in R. Kaplan & M. Kay, *Regular Models of Phonological Rule Systems,* Computational Linguistics, 20:3, pp. 331–378 (1994) and L. Karttunen, *The Replace Operator,* Proceedings of the 33rd Annual Meeting of the Association for Computational Linguistic, ACL-94, pp. 16–23. Upper-case strings, like UPPER, represent regular languages, while lower case strings, like x, and ab represent symbols. Two types of symbols are recognized: unary and symbol pairs. Unary symbols are represented as: a, b, c, etc.; while symbol pairs can be represented, for example as follows: a:x, b:0. A symbol pair of the form a:x may be thought as the cross product of the upper symbol, a, and the lower symbol, x. To make this notation less cumbersome the distinction between a language A and the identity relation that maps every string of A into itself is systematically ignored. Thus, a:a is also written as just a.

Regular expressions may use a number of special symbols: 0, ?, and %. Zero, 0, represents the empty string, which is also often denoted by [text2html_wrap_inline615]. A question mark, ?, stands for any symbol in the known alphabet and its known extensions. The percent sign, %, functions as an escape character, which allows letters that have a special meaning in the calculus to be used as ordinary symbols. Thus, the square bracket, [, which has special meaning as a grouping symbol becomes simply a square bracket using the notation %[. Similarly, 0, the empty string symbol, becomes merely zero given the notation %0.

Two simple expressions are used frequently. The first is [], which denotes the empty string language. The second simple expression is ?*, which denotes the universal language, also called the sigma star. A number of regular expression operators are used herein. * zero or more is known as the Kleene star. + one or more denotes the Kleene plus. ~ not represents the complement operation. The contains operation is represented by $, while the ignore operation is represented by /. Union, also called or, is denoted by |. & represents the and operation, also known as the intersection operation. The relative complement operation is represented by the minus symbol, −. .x. denotes the crossproduct operation, .o. denotes the composition operation, and → denotes the simple replace operation.

Given this explanation of notation, consider now the transducer diagram of FIG. 1. Finite state transducer 30 includes three states 32, 34, and 36 and several transitions 40, 42, 44, 46, 48, 50 and 52. States are represented via circles, nonfinal states, like state 36, via a single circle and final states, such as states 32 and 34 are represented by a circle within a circle. Initial transducer states, like state 32, are indicated by the number 0 within the circle. For this reason the initial state is often called the 0 state. Each transition between states is labeled with symbols, with the ? symbol used to indicate symbols that are not explicitly present in the network. Transitions that differ only with respect to label are collapsed into a single, multiply labeled arc, such as transition 50, for example.

Figure 2:
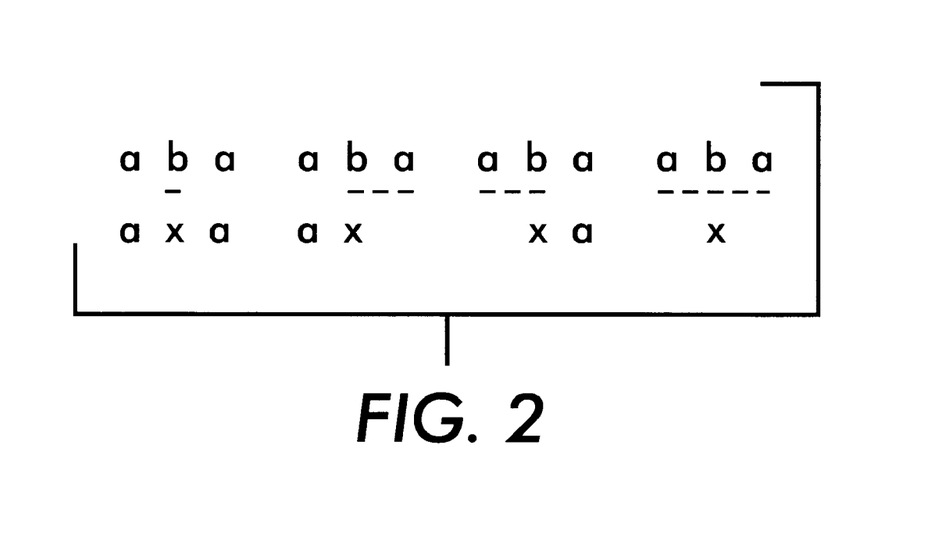
FIG. 2 shows underlined the four alternate factorizations of the input string of FIG. 1.

Finite state transducer 30 represents a simple replace for the union of ab, b, ba, aba with x; i.e., ab|b|ba|aba →x. Applying input string aba and analyzing the possible output strings illustrates the nondeterministic behavior of finite state transducer 30. As shown by FIG. 2, application of the input string aba can produce four different output strings, axa, ax, xa, and x, because there are four paths in transducer 30 that contain aba on the upper side of the transitions with different strings on the lower side of the transitions. Stated another way, transducer 30 produces four alternate ways to partition the upper input string aba. The replacement expression axa results from starting at state 32, taking transition 40 back to state 32, taking transition 42 to state 34 and transition 50 back to state 32. This route through transducer 30 can be notated as <0 a 0 b:x 2 a 0>, where in general numbers indicate states and the symbols labels on transition, with the exception that 0 is used to indicate both a state and parts of transition labels. Thus, replacement expression ax results from <0 a 0 b:x 2 a:0 0>. Similarly, <0 a:x 1 b:0 2 a 0>yields the replacement expression xa and <0 a:x 1 b:0 2 a:0 0>gives rise to the replacement expression x. Thus, transducer 30 yields multiple results even though the lower language consists of a single string. This is called nondeterminism.

Nondeterminism is frequently associated with transducers compiled from simple replace expressions, like UPPER →LOWER. Nondeterminism arises in two different ways, as discussed in L. Kartunnen, *Constructing Lexical Transducers,* Proceedings of the Fifteenth International Conference on Computational Linguistics, Coling 94, I, pp. 406–411 (1994); and in A. Kempe & L. Karttanen, *Parallel Replacement in the Finite-State Calculus,* Proceedings of the Sixteenth International Conference on Computational Linguistics, Coling 96 (1996). One way nondeterminism arises is from allowing a replacement to begin at any point within the input string. Thus, different replacement strings result for the input string aba depending on whether replacement begins at the beginning of the string or with b. Nondeterminism also arises because there may be multiple, alternate, replacements given the same starting point. For example, given input string aba and choosing to begin at the beginning of the string either ab or aba may be replaced via transition 40. Thus, nondeterministic transducers yield multiple results even if the lower language consists of a single string.

SUMMARY OF THE INVENTION

An object of the present invention is to provide a method of transducing an input string to produce a unique output string whenever the lower language consists of a single string.

This and other objects are satisfied by the processor implemented method of the present invention for modifying a string of a first regular language, which includes at least two symbols and at least two predetermined substrings, each of which has an associated substring in a second language. Upon receipt of the string, the processor determines an initial position within the string of a substring matching one of the preselected substrings. To make this determination, the processor either matches symbols of the string starting from the left and proceeding to the right or by starting from the right and proceeding to the left. After identifying the initial position, the processor then selects either the longest or the shortest of the preselected substrings. The processor then replaces the matching substring with substring of the second language associated with the selected preselected substring and outputs the modified string.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

Figure 3:
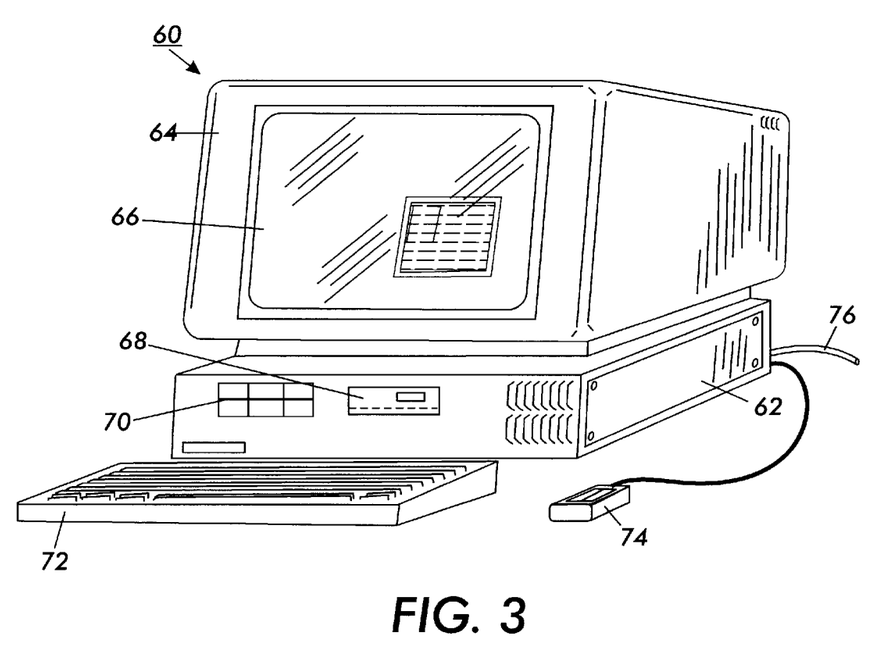
FIG. 3 shows an exemplary computer system which may be used to implement the methods of the present invention.
Figure 4:
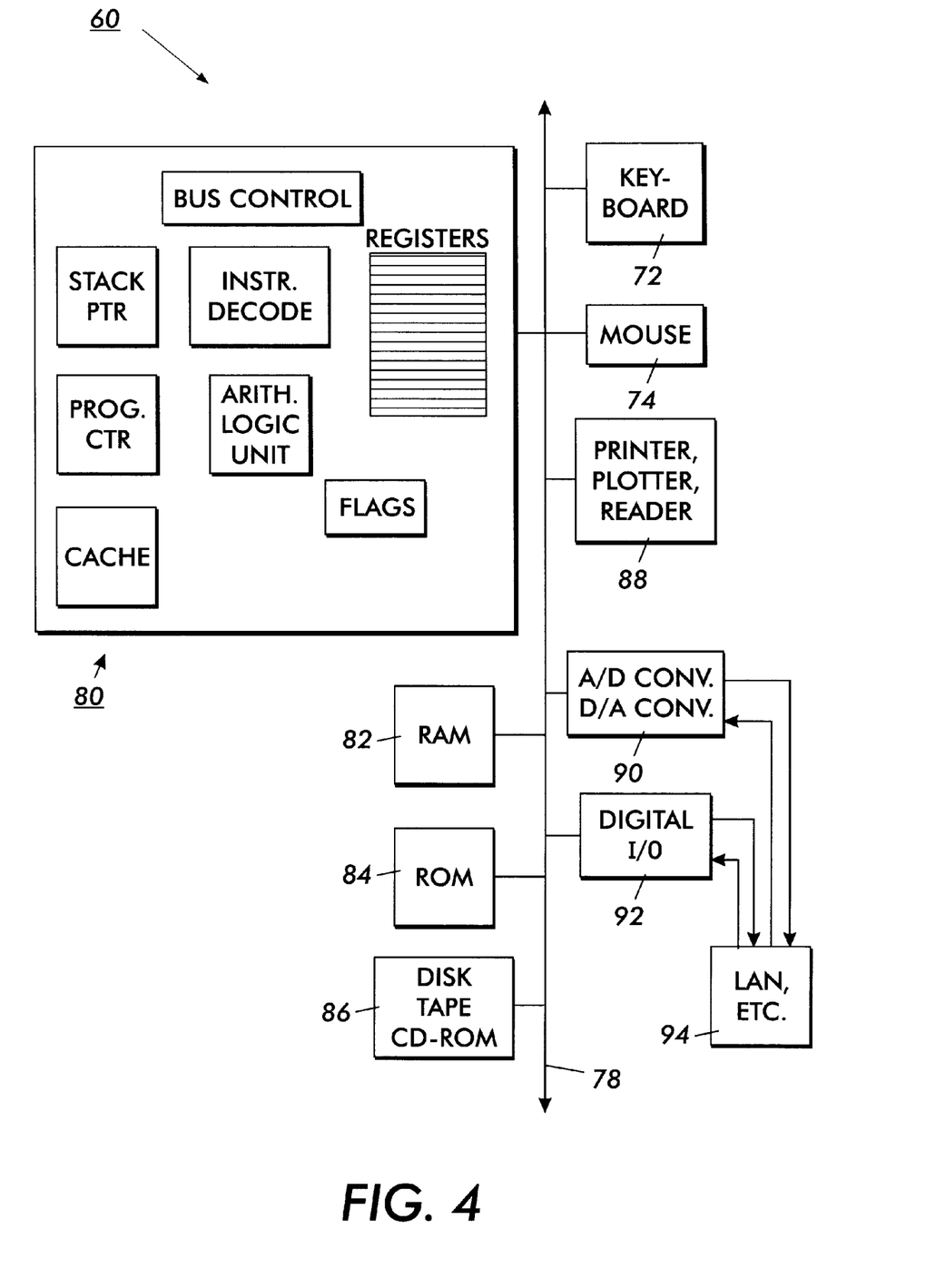
FIG. 4 is a schematic block diagram of the computer system of FIG. 3.
Figure 5:
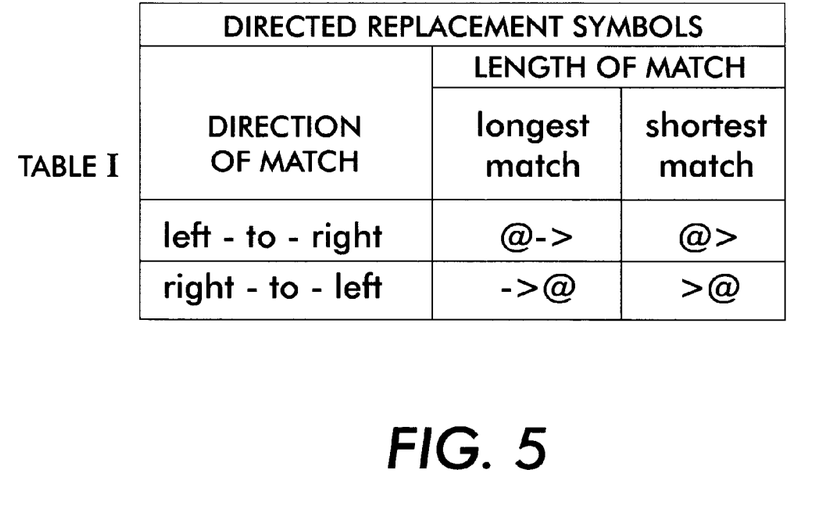
FIG. 5 illustrates four alternative forms of the directed replacement operator of the present invention.

FIGS. 3 and 4 illustrate computer system 60 in which the present method is implemented by executing computer instructions for realizing one of the directed replacement methods of FIG. 5. Each directed replacement method of the present invention insures that a unique output string is produced whenever the lower language consists of a single string. Thus, the directed replacement methods of the present invention are deterministic. Briefly described, the methods of the present invention insure a unique outcome whenever the lower language of a relation consists of a single string by constraining both the length and the directionality of the replacement. An implementation of one of the methods of the present invention will be described in detail with respect to FIGS. 8 and 13.

A. A Computer System for Directed Replacement

Prior to a more detailed discussion of the present method, consider computer system 60. As shown in FIG. 3, computer system 60 includes housing 62, CRT 64, which includes monitor 66 for visually displaying information to a computer user. Computer system 60 provides the computer user multiple avenues to input data. Keyboard 72 allows the computer user to input data to computer system 60 by typing. By moving mouse 74 the computer user is able to move a pointer displayed on monitor 66. The computer user may also input information to computer system 60 by writing on an electronic tablet with a stylus or pen (not shown). Alternately, the computer user can input data stored on a magnetic medium, such as a floppy disk, by inserting the disk into floppy disk drive 70. For data used frequently, computer system 60 includes hard disk drive 68. Network cable 76 couples computer system 60 to a local or wide area network.

FIG. 4 illustrates computer system 60 in block diagram form. Processor 80 controls and coordinates the operations of computer system 60 to execute the commands of the computer user. Processor 80 determines and takes the appropriate action in response to each user command by executing instructions stored electronically in memory, either random access memory (RAM) 82, read only memory (ROM) 84 or on a floppy disk within floppy disk drive 68. Typically, operating instructions for processor 80 are stored in solid state memory, allowing frequent and rapid access to the instructions. Common bus 78 couples processor 80 to memory devices 82 and 84 and to the other components of system 60. These include disk, tape or CD ROM drives 86, keyboard 72, mouse 74, printing, plotting or scanning devices 88, and A/D and D/A converters 90 and digital input/output devices 92, which interface with external devices and other networks, such as LAN 94. A computer system like that illustrated in FIG. 4 is described in greater detail in Horowitz and Hill, *The Art of Electronics,* 2nd Ed. 1989, Ch. 10.

B. Overview of Directed Replacement

The directed replacement methods of the present invention satisfy the need for a replacement method that produces a unique outcome whenever the lower language of the relation consists of a single string. The present methods achieve this effect by constraining both the length and the directionality of the replacement. As used herein, directionality means that the replacement sites in the input string are selected by scanning the symbols of the input either starting from the left and proceeding to the right or starting from the right and proceeding to the left, and that no overlaps are allowed. The length of the substring to be replaced is constrained in that either the longest or the shortest replacement substring must always be selected whenever there are multiple candidate strings starting at a given location within an input string. The term directed replacement is used herein for any replacement operation in which both length and directionality are constrained. These two constraints define four types of directed replacement, which are listed, along with their symbols in Table I of FIG. 5. The directed replacement resulting from proceeding from left-to-right, and always choosing the longest match is represented by the symbol "@→", while the directed replacement resulting from proceeding from left-to-right and always choosing the shortest match is represented by the symbol "@>". This change in the length of the replacement is reflected in the shorter arrow of the latter symbol as compared to the former. Note also that the "@" occurs to the left of the arrow, indicating the type of the directionality restraint. Thus, for the two remaining symbols for directed replacement, which proceed from right-to-left, the "@" appears to the right of the arrow, yielding "→@" for a directed replacement proceeding from right-to-left and always selecting the longest match within the string for replacement and ">@" for the directed replacement proceeding from right-to-left and always selecting the shortest match within the string for replacement.

Figure 6:
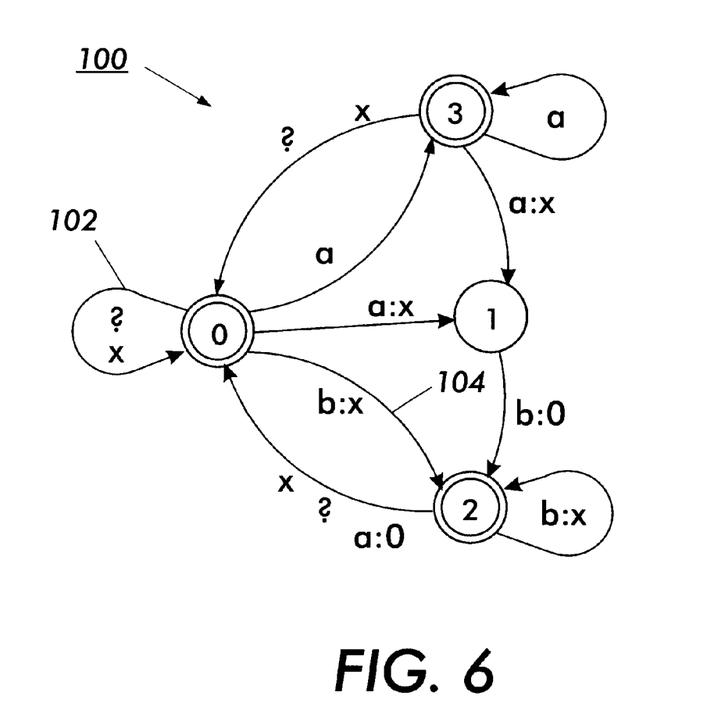
FIG. 6 is a representation of the transducer for a b|b|b a|a b a @→x (left-to-right, longest-match in FIG. 5).
Figure 7:
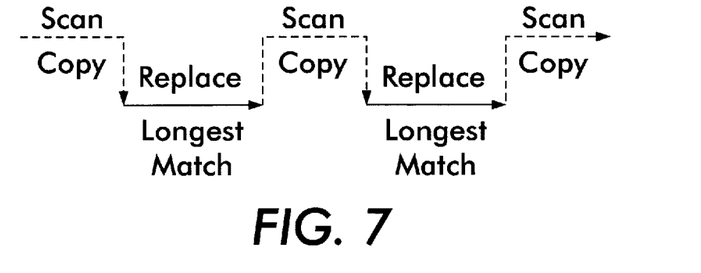
FIG. 7 schematically illustrates the left-to-right, longest-match technique of FIG. 6.

To illustrate how the directionality and length constraints impose a unique factorization upon an input string, consider the left-to-right, longest match operator, @→, and FIGS. 6 and 7. It will be apparent to persons skilled in the art that the other cases are similar. FIG. 6 illustrates finite state transducer 100 for mapping the input string "aba" into the unique output string "x" via the directed replacement operator @→. The effect of the directionality and length constraints of the directed replacement is that some possible replacements are ignored. Starting from the left of the input string and forced to choose the longest match from that point, "aba" must be replaced, ignoring the possible replacements for "b", "ba", and "ab". Thus, the @→operator allows only the last factorization of "aba" shown in FIG. 2.

FIG. 7 schematically illustrates the replacement technique of FIG. 6. The left-to-right, longest-match replacement can be thought of as a procedure that rewrites an input string sequentially from left to right. Processor 80 when implementing the operator copies the symbols of the input string until processor 80 identifies an instance of UPPER. At that point processor 80 selects the longest matching substring as the substring to be replaced, which is rewritten as LOWER; i.e. as the lower substring associated with the replacement substring. Processor 80 then proceeds from the end of the substring just replaced of the input string without considering any other alternative substrings that could have been replaced given the same starting point.

It is not obvious at the outset that the operation can in fact be encoded as a finite-state transducer for arbitrary regular patterns. Although a unique substring is selected for replacement at each point, in general the transduction is not unambiguous because LOWER is not required to be a single string; it can be any regular language. The crucial finding is that the two constraints, left-to-right and longest-match, force a unique factorization on the input string, thus making the transduction unambiguous if the LOWER language consists of a single string. In effect, the input string is unambiguously parsed with respect to the UPPER language. This property turns out to be important for a number of applications.

Preferably, finite state transducers are used to realize the directed replacement methods of the present invention. Although the same results could often be achieved using UNIX utilities like, lex and yacc, sed, awk, or perl, using finite state transducers instead permits smooth integration with other finite-state processes, such as morphological analysis by lexical transducers and rule-based part-of-speech disambiguation. These finite state transducers may be realized in an appropriate computer language, such as C++ or Lisp, for example. The computer instructions for processor 80 may then be stored within any of the memory devices with computer system 60, such as RAM 82, ROM 84, or a disk inserted into drive 86.

C. Implementing Directed Replacement Operators

Preferably, the directed replacement operators of the present invention are realized by means of a composition of regular relations. As is common in the related art, the intermediate levels of the composition introduce auxiliary symbols to express and enforce constraints on the replacement relation. See, for example, Ronald M. Kaplan and Martin Kay, *Regular Models of Phonological Rule Systems*, Computational Linguistics, 20:3, 1994, pp. 331–378 (1994) and Karttunen, *The Replace Operator*, Proceedings of the 33rd Annual Meeting of the Association for Computational Linguistics, ACL-94, pp. 16–23, Boston, Massachusetts (1995).

Figure 8:
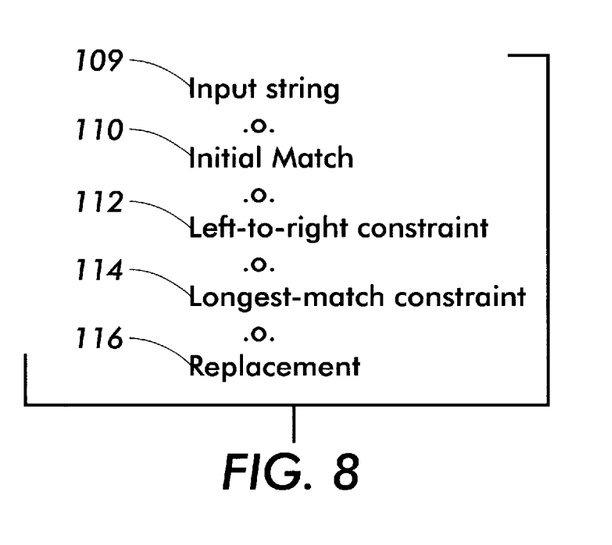
FIG. 8 shows the component relations of one of the directed replacement operators.

FIG. 8 shows for the direct replacement operator @→ of the present invention the component relations and how they are composed with the input string 109. (Note the composition symbol ".o." in FIG. 8.) The directed replacement operator @→ includes four regular relations: initial match 110, left-to-right constraint 112, longest-match 114, and replacement 116, which are realized as computer instructions to be executed by processor 80. If relations 110, 112, 114 and 116 are composed in advance, as is preferred, the application of the replacement to input string 109 takes place in one step without any intervening levels and no auxiliary symbols are used. However, auxiliary symbols are used in the following figures to illustrate the operation of the directed replacement operator @→.

Consider now the case of a b|b|b a|a b a @→x applied to the input string "aba" and how the mapping implemented by transducer 100 of FIG. 6 is composed from the four component relations. Based upon the assumption that these symbols do not occur in any input string, three auxiliary symbols are used herein: caret (^), left bracket (<) and right bracket (>).

Figure 9:
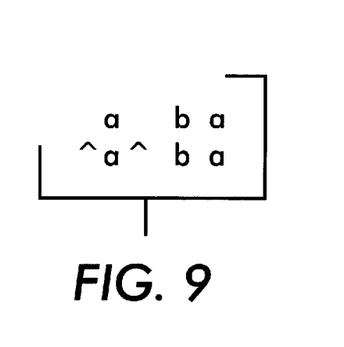
FIG. 9 illustrates caret insertion in a substring during the initial match step of FIG. 8.

FIG. 9 illustrates use of the caret insertion symbol in a substring to indicate the initial match location for initial match 110. This composes the input string with a transducer that inserts a caret in the beginning of every substring that belongs to the upper language; i.e., matches "ab", "b", "ba", or "aba". Note that only one ^ is inserted even if there are several candidate strings starting at the same location.

Figure 10:
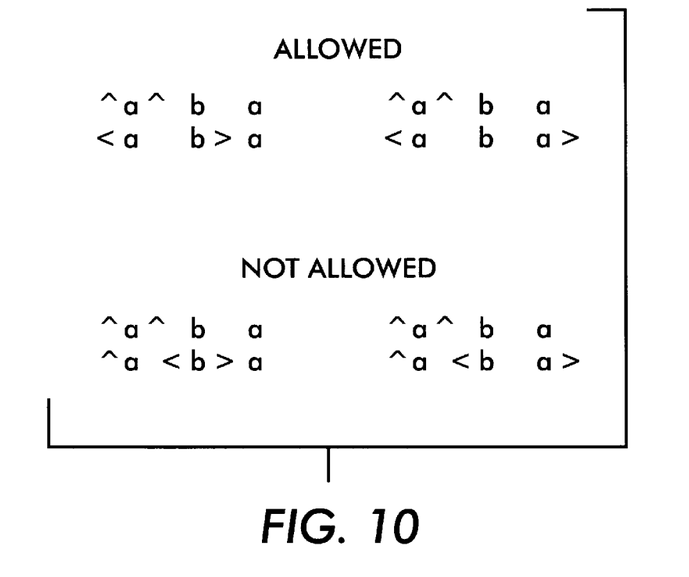
FIG. 10 shows allowable and non-allowable bracketing of substrings in implementing the left-to-right constraint of FIG. 8.

FIG. 10 shows allowable and non-allowable bracketing of substrings in implementing the left-to-right constraint 112. In realizing left-to-right constraint 112, all the substrings starting at a location marked by a caret, ^, that are instances of the upper language are enclosed in angle brackets. The initial caret is replaced by a <, and a closing > is inserted to mark the end of the match. It is permitted for carets to appear freely while matching. No carets are permitted outside the matched substrings and the ignored internal carets are eliminated. Given transducer 100 and the input string "aba", there are four possible outcomes, as shown in FIG. 10, but only two of them are allowed under the constraint that there can be no carets outside the brackets. Note that the four alternatives in FIG. 10 represent the four factorizations of FIG. 2. The effect of ignoring internal carets is that no starting location for a replacement can be skipped over except in the context of another replacement starting further left in the input string. A similar technique for imposing the left-to-right order on the transduction was introduced by Emmanuel Roche and Yves Schabes in *Deterministic Part-of-Speech Tagging*, Computational Linguistics, 21:2, pp. 227–53 (1995).

Figure 11:
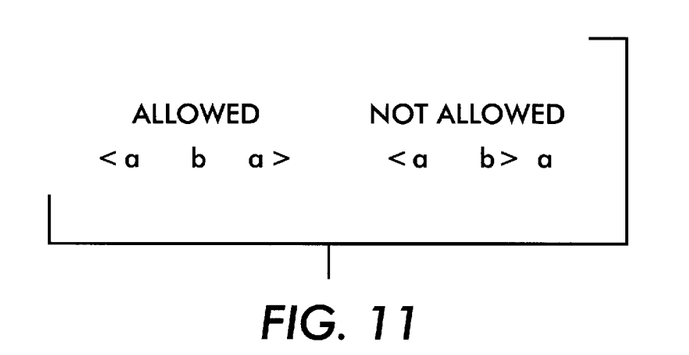
FIG. 11 shows allowable and non-allowable bracketing of substrings in implementing the longest match constraint of FIG. 8.

FIG. 11 shows allowable and non-allowable bracketing of substrings in implementing longest match constraint 114. Longest-match constraint 114 is realized as the identity relation on a certain set of strings that forbids any replacement that starts at the same location as another, longer replacement. This means that for the directed replacement operator @→ that the internal > is disallowed in the context <a b >a because there is a longer, and therefore preferred alternative match, <a b a >, at the same starting location.

In the step of the directed replacement, replacement 116, processor 80 replaces the bracketed regions of input string 109, <a b a> in the case at hand, with the string of the lower language, yielding "x" as the result.

Figure 12:
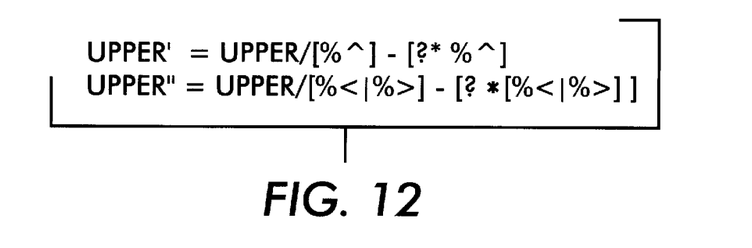
FIG. 12 presents versions of UPPER that freely allow non-final diacritics.

Note that longest match constraint 114 ignores any internal brackets. For example, the bracketing <a ><a > is not allowed if the upper language contains "aa" as well as "a". Similarly, the left-to-right constraint 112 ignores any internal carets. As the first step towards a formal definition of UPPER @→LOWER it is useful to make the notion of "ignoring internal brackets" more precise. FIG. 12 sets forth the auxiliary definitions necessary to ignored internal brackets. For the details of the formalism, consult Karttunen, *The Replace Operator*, Proceedings of the 33rd Annual Meeting of the Association for Computational Linguistics. ACL-94, pp. 16–23, Boston, Mass. (1995) and Kempe and L. Karttunen, *Parallel Replacement in the Finite-State Calculus*, Proceedings of the Sixteenth International Conference on Computational Linguistics, Coling 96 (1996). UPPER' is the same language as UPPER except that carets may appear freely in all nonfinal positions. Similarly, UPPER" accepts any nonfinal brackets.

Figure 13:
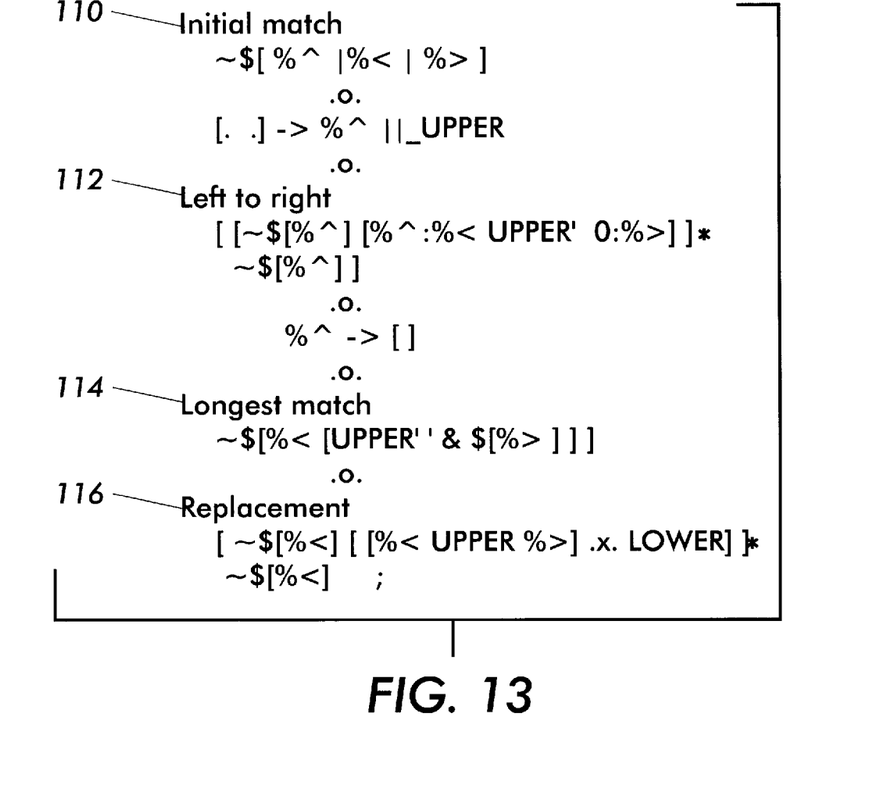
FIG. 13 illustrates the relation UPPER @→LOWER for the directed replacement method of the present invention.

FIG. 13 sets forth the precise definition of the relation UPPER @→LOWER outlined in FIG. 8. This precise definition of the relation is a composition of many auxiliary relations.

The logic of the @→ replacement could be encoded in many other ways than that illustrated in FIG. 13, for example, by using the three pairs of auxiliary brackets, <i, >i, <c, >c, and <a, >a, which were introduced by Kaplan and Kay in *Regular Models of Phonological Rule Systems*, Computational Linguistics, 20:3, pp. 331–378 (1994). However, a more minimalist approach is taken with the relation of FIG. 13. One reason is that it is considered preferable to think of the simple unconditional (uncontexted) replacement as the basic case, as in L. Karttunen, *The Replace Operator*, Proceedings of the 33rd Annual Meeting of the Association for Computational Linguistics, ACL-94, pp. 16–23 (1995). Without the additional complexities introduced by contexts, the directionality and length-of-match constraints can be encoded with fewer diacritics. (It is believed that the conditional case can also be handled in a simpler way than in R. Kaplan & M. Kay, *Regular Models of Phonological Rule Systems*, Computational Linguistics, 20:3, pp. 331–378 (1994)). The number of auxiliary markers is an important consideration for some of the applications discussed below.

In a phonological or morphological rewrite rule, the center part of the rule is typically very small: a replacement or modification of one segment. On the other hand, in certain text processing applications, the upper language may involve a large network representing, for example, a lexicon of multiword tokens. Practical experience shows that the presence of many auxiliary diacritics makes it difficult or impossible to compute the left-to-right and longest-match constraints in such cases. The size of intermediate states of the computation becomes a critical issue, while it is irrelevant for simple phonological rules. This issue will be discussed further, in the context of tokenizing transducers, in Section D below.

The transducers derived from the definition in FIG. 13 have the property that they unambiguously parse the input string into a sequence of substrings that are either copied to the output unchanged or replaced by some other strings. However these transducers do not fall neatly into any standard class of transducers discussed in the literature, for example, Samuel Eilenberg, *Automata, Languages, and Machines*, Academic Press (1974); Marcel Paul Schutzenberger, *Sur une variante des fonctions sequentielles*, Theoretical Computer Science, 4, pp. 47–57 (1977); and Jean Berstel, *Transductions and Context-Free Languages*, B. G. Teubner in Stuttgart, (1979). If the LOWER language consists of a single string, then the relation encoded by the transducer is in Berstel's terms a rational function, and the network is an unambiguous transducer, even though it may contain states with outgoing transitions to two or more destinations for the same input symbol. An unambiguous transducer may also be sequentiable, in which case it can be turned into an equivalent sequential transducer, which can in turn be minimized. See Mehryar Mohri, *On Some Applications of Finite-State Automata Theory to Natural Language Processing: Technical Report* 94–22, L'Institute Gaspard Monge, Universite de Mame-la-Vallee, Noisy Le Grand (1994). A transducer is sequential just in case there are no states with more than one transition for the same input symbol. Such transducers are called deterministic by Emmanuel Roche and Yves Schabes, in *Deterministic Part-of-Speech Tagging*, Computational Linguistics, 21:2, pp. 227–53 (1995).

Figure 14:
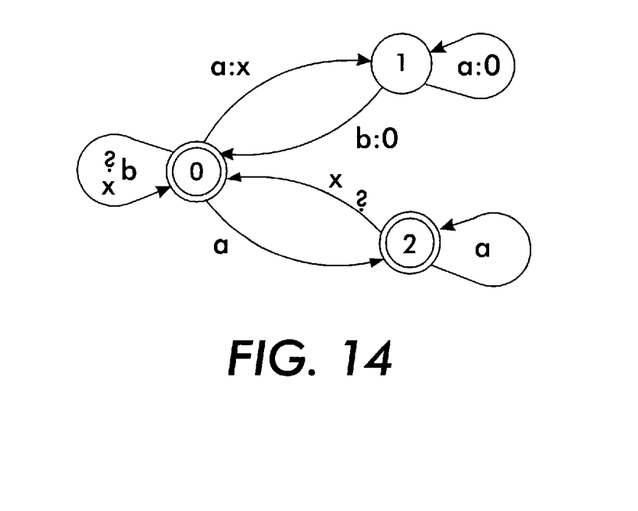
FIG. 14 shows a simple transducer for a+b @→x.
Figure 15:
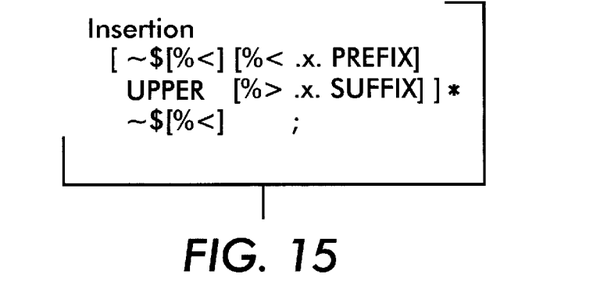
FIG. 15 illustrates an insertion expression in the definition of UPPER @→PREFIX . . . SUFFIX in one embodiment of the invention.

The replacement transducers employed in accordance with the present invention in general are not unambiguous because LOWER is allowed to be any regular language. It may well be that, in most applications of this technique, the lower language is in fact a singleton, or at least some finite set, but it is not so by definition. Even if the replacement transducer is unambiguous, it may well be unsequentiable if UPPER is an infinite language. For example, the simple transducer for a+b @→x in FIG. 14 cannot be sequentialized. It has to replace any string of "a"s by "x" or copy it to the output unchanged depending on whether the string eventually terminates in "b". It is obviously impossible for any finite-state device to accumulate an unbounded amount of delayed output. On the other hand, the transducer in FIG. 6 is sequentiable because the choice between a and a:x just depends on the next input symbol. Because none of the classical terms fits exactly, a novel term, directed transduction, has been chosen to describe a relation induced by the definition in FIG. 13. This term is meant to suggest that the mapping from the input into the output strings is guided by the directionality and length-of-match constraints. Depending on the characteristics of the UPPER and LOWER languages, the resulting transducers may be unambiguous and even sequential, but that is not guaranteed in the general case.

D. Applications of Directed Replacement

The directed replacement operators of the present invention have many useful applications, some of which are described below. Although the same results could often be achieved by using lex and yacc, sed, awk, perl, and other UNIX utilities, there is an advantage in using finite-state transducers for these tasks because they can then be smoothly integrated with other finite-state processes, such as morphological analysis by lexical transducers, like those described in Lauri Karttunen, Kirnmo Koskenniemi, and Ronald M. Kaplan in *A Compiler for Two-level Phonological Rules, Report No. CSLI*-87-108, Centre for the Study of Language and Information, Stanford University, Palo Alto, California (1987), and in Lauri Karttunen, *Constructing Lexical Transducers*, Proceedings of the Fifteenth International Conference on Computational Linguistics, Coling 94, I, pp. 406–411, Kyoto, Japan (1994). The directed replacement operators of the present invention can also be smoothly integrated with rule-based part-of-speech disambiguation, like that described by Chanod and Tapanainen in *Tagging French— Comparing a Statistical and a Constraint-Based Model*, Proceedings of the Seventh Conference of the European Chapter of the Association for Computational Linguistics, Dublin, Ireland (1995) and by Roche and Schabes in *Deterministic Part-of-Speech Tagging*, Computational Linguistics, 21:2, pp. 227–53 (1995).

D.1 Tokenization

A tokenizer is a device that segments an input string into a sequence of tokens. The insertion of end-of-token marks can be accomplished by a finite-state transducer that is compiled from tokenization rules. The tokenization rules may be of several types. For example, [WHITE_SPACE+ @→SPACE] is a normalizing transducer that reduces any sequence of tabs, spaces, and new lines to a single space. [LETTER+@→END_OF_TOKEN] inserts a special mark, e.g. a new line, at the end of a letter sequence.

Although a space generally counts as a token boundary, it can also be part of a multiword token, as in expressions like "at least", "head over heels", "in spite of", etc. Thus the rule that introduces the END_OF_TOKEN symbol needs to combine the LETTER+ pattern with a list of multiword tokens which may include spaces, periods and other delimiters.

Figure 18:
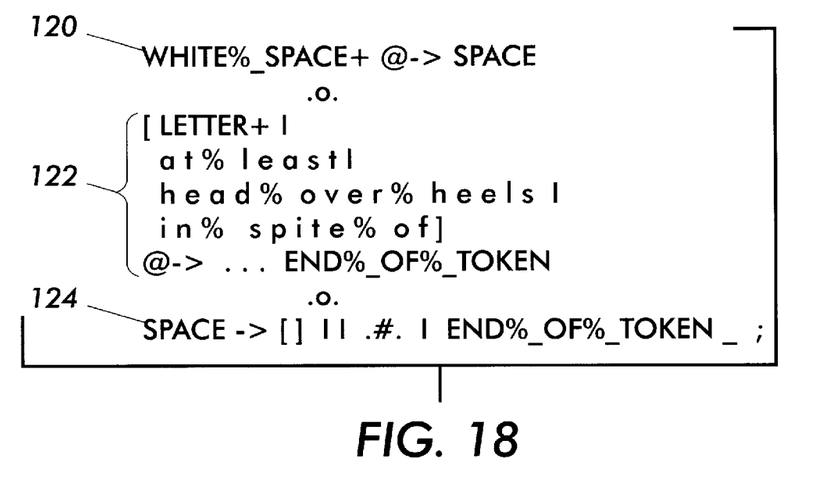
FIG. 18 illustrates the application of the present invention in one embodiment—in the construction of a simple tokenizer for the English language.

FIG. 18 illustrates the application of the present invention in one embodiment in the construction of a simple tokenizer for the English language. The tokenizer in FIG. 18 is composed of three transducers 120, 122 and 124. The first transducer 120 reduces strings of whitespace characters to a single space. The second transducer 122 inserts an END_OF_TOKEN mark after simple words and the listed multiword expressions. The third transducer 124 removes the spaces that are not part of some multiword token. As mentioned above, the percent sign here means that the following blank is to be taken literally, that is, parsed as a symbol.

Without the left-to-right, longest-match constraints, the tokenizing transducer would not produce deterministic output. Note that it must introduce an END_OF_TOKEN mark after a sequence of letters just in case the word is not part of some longer multiword token. This problem is complicated by the fact that the list of multiword tokens may contain overlapping expressions. A tokenizer for French, for example, needs to recognize "de plus" (moreover), "en plus" (more), "en plus de" (in addition to), and "de plus en plus" (more and more) as single tokens. Thus, there is a token boundary after "de plus" in de plus on ne le fait plus (moreover one doesn't do it anymore) but not in on le fait de plus en plus (one does it more and more) where "de plus en plus" is a single token.

If the list of multiword tokens contains hundreds of expressions, it may require a lot of time and space to compile the tokenizer even if the final result is not too large. The number of auxiliary symbols used to encode the constraints has a critical effect on the efficiency of that computation. This phenomenon was first observed in the course of building a tokenizer for the British National Corpus according to the specifications of the BNC Users Guide, described by Leech in *User's Guide to the British National Corpus*, Lancaster University (1995). This tokenizer lists around 300 multiword tokens and 260 foreign phrases. With the current definition of the directed replacement we have now been able to compute similar tokenizers for several other languages, including French, Spanish, Italian, and German.

D.2 Filtering

Some text processing applications involve a preliminary stage in which the input stream is divided into regions that are passed on to the calling process and regions that are ignored. For example, in processing an SGML-coded document, we may wish to delete all the material that appears or does not appear in a region bounded by certain SGML tags, say <A> and </A>.

Figure 19:
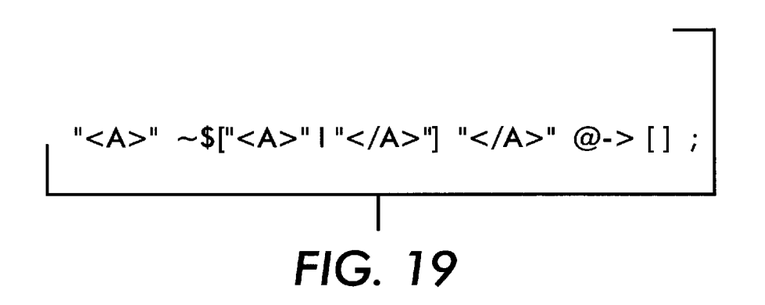
FIG. 19 shows a negative filter used in text filtering in one application of the present invention.

Both types of filters can easily be constructed using an embodiment of the directed replace operator according to the invention. FIG. 19 shows a negative filter used in text filtering in one application of the present invention. A negative filter for deleting all the material between the two SGML codes, including the codes themselves, is expressed as in FIG. 19.

Figure 20:
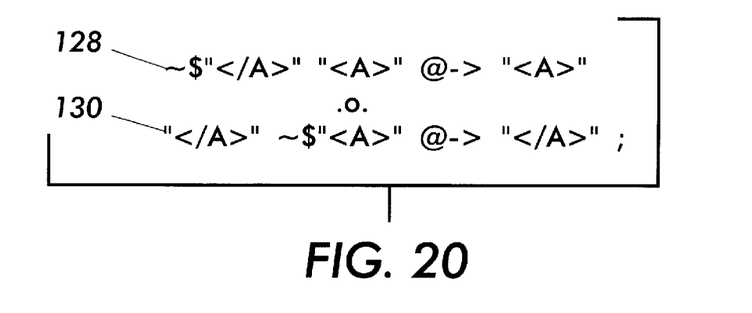
FIG. 20 shows a positive filter used in text filtering in one application of the present invention.
Figure 21:
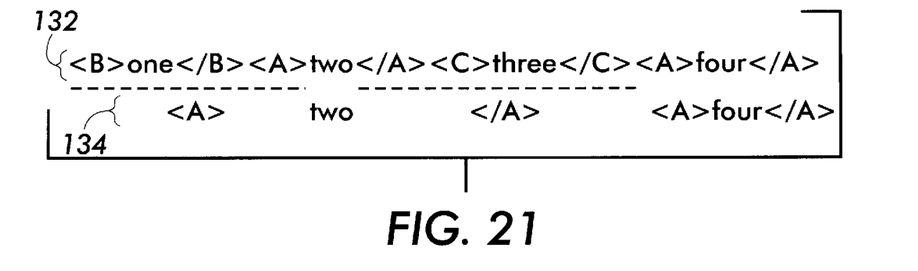
FIG. 21 shows the effect of the positive filter of FIG. 20.

FIG. 20 shows a positive filter used in text filtering in one application of the present invention. A positive filter excludes everything else; i.e., outside the two SGML codes. The positive filter is composed of two transducers 128 and 130. The first transducer 128 reduces to <A> any string that ends with it and does not contain the </A> tag. The second transducer 130 does a similar transduction on strings that begin with </A>. FIG. 21 illustrates the effect of the positive filter on an input string 132, which produces output string 134.

The technique of filtering by finite-state transduction of course does not depend on SGML codes. It can be applied to texts where the interesting and uninteresting regions are defined by any kind of regular pattern.

D.3 Marking

As was observed above, by using the ... symbol on the lower side of the replacement expression, transducers can be constructed that mark instances of a regular language without changing the text in any other way. Such transducers have a wide range of applications. They can be used to locate all kinds of expressions that can be described by a regular pattern, such as proper names, dates, addresses, social security and phone numbers, and the like. Such a marking transducer can be viewed as a deterministic parser for a "local grammar" in the sense discussed by Gross in *The Use of Finite Automata in the Lexical Representation of Natural Language, Electronic Dictionaries and Automata in Computational Linguistics*, Lecture Notes in Computer Science, pp. 34–50, Springer-Verlag, Berlin, Germany (1989), and by Roche in *Analyse syntaxique transformationelle du francais par transducteurs et lexique-grammaire*, Doctoral dissertation, Université Paris 7 (1993), and by Silberztein in *Dictionnaires Electroniques et Analyse Lexicale du Francais—Le Systeme INTEX*, Masson, Paris, France (1993).

By composing two or more marking transducers, a single transducer that builds nested syntactic structures, up to any desired depth can also be constructed.

Figure 16:
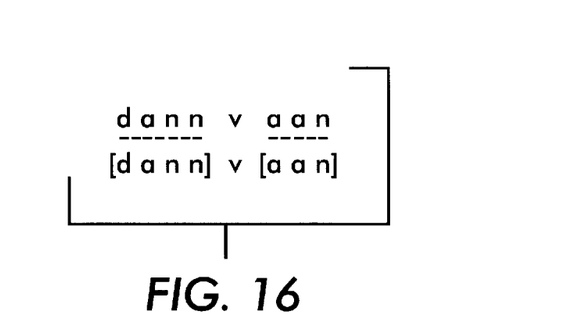
FIG. 16 depicts the application of (d)a* n+@→%[ . . . %], to insert brackets around maximal instances of the noun phrase pattern, to a substring dannvaan.
Figure 17:
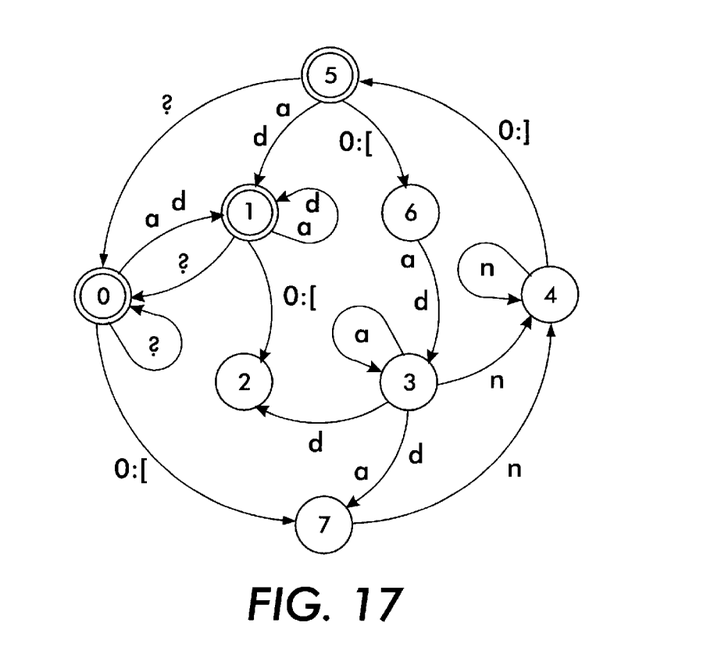
FIG. 17 shows the transducer resulting from (d)a* n+@→%[ ... %] and applied to dannvaan, as in FIG. 1.
Figure 22:
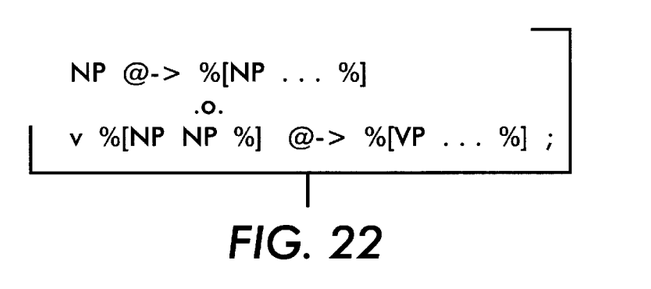
FIG. 22 illustrates the composition of an NP and a VP spotter in the application of the present invention to marking of text.
Figure 23:
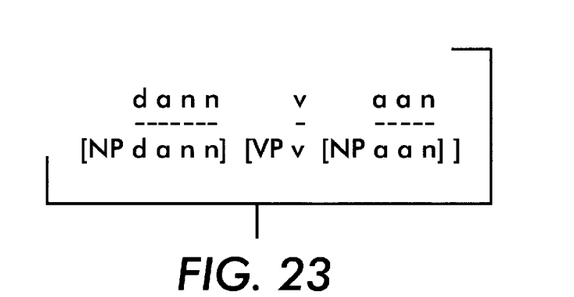
FIG. 23 shows the effect of applying the composite transducer of FIG. 22 to the string dannvaan.
Figure 24:
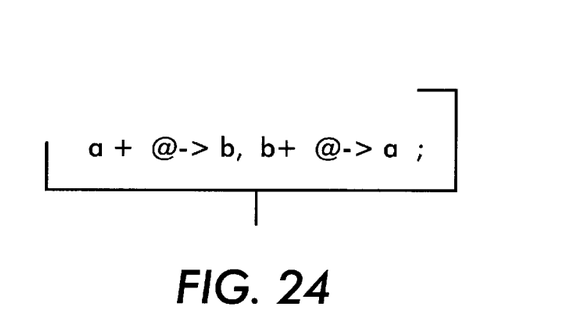
FIG. 24 illustrates a further embodiment of the present invention, effecting directed, parallel replacement.

To make the construction simpler, auxiliary symbols for the basic regular patterns can first be defined. For example, NP (noun phrase) may be defined as [(d) a* n+]. With that abbreviatory convention, a composition of a simple NP and VP (verb phrase) spotter can be defined as in FIG. 22. FIG. 23 shows the effect of applying this composite transducer to the string "dannvaan", which phrase was mentioned earlier in the embodiment described with reference to FIG. 16.

By means of this simple "bottom-up" technique, it is possible to compile finite-state transducers that approximate a context-free parser up to a chosen depth of embedding. Of course, the left-to-right, longest-match regimen implies that some possible analyses are ignored. To produce all possible parses, we may introduce the ... notation to the simple replace expressions described by Karttunen in *The Replace Operator*, Proceedings of the 33rd Annual Meeting of the Association for Computational Linguistic, ACL-94, pp. 16–23 (1995).

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A processor implemented method of modifying an input string of a regular language, the input string including at least two symbols, the method comprising:
    a) receiving the input string;
    b) applying the input string to a finite state data structure to obtain an output string that is a modified version of the input string in which a first substring in the input string is replaced by a second substring in the output string; the finite state data structure indicating a set of replaceable substrings that includes the first substring and indicating, for each replaceable substring, a replacement substring, the second substring being the replacement substring of the first substring; the input string being partitionable into any of two or more different substring series in accordance with the set of replaceable substrings; the finite state data structure partitioning the input string into a substring series that includes the first substring in accordance with a directionality constraint and a length constraint; the finite state data structure being derived to partition input strings only in accordance with the directionality constraint and the length constraint;
    the directionality constraint requiring partition of the input string as if the set of replaceable substrings were compared with the input string by one of from-left-to-right and from-right-to-left; and
    the length constraint requiring partition of the input string as if, where two or more of the set of replaceable substrings could be matched, one of the matching replaceable substrings was selected for replacement, the selected substring being the longest or the shortest; and
    c) providing the output string as output.

2. The method of claim 1 wherein the second substring includes a copy of the first substring and also includes one or more marking elements.

3. The method of claim 2 wherein the second substring includes a first marking element at an end of the cony of the first substring.

4. The method of claim 3 wherein the first substring includes a multiword token and the first marking element includes an end-of-token symbol.

5. The method of claim 2 wherein the second substring includes a second marking element at a start of the copy of the first substring.

6. The method of claim 5 wherein the second substring further includes a third marking element at an end of the copy of the first substring and wherein the first substring is one of a set of regular expressions, the second marking element including a prefix symbol, and the third marking element including a suffix symbol.

7. The method of claim 1 wherein the first substring is one of a proper name, a date, an address, a formatted number, a sequence of white space characters, a letter sequence, a multiword expression, or a phrase.

8. The method of claim 1 in which the finite state data structure is a finite state transducer.

9. The method of claim 1 wherein the the second substring includes a string from a second regular language.

10. The method of claim 9 wherein the first substring includes a first indicator at a start of the first substring and a second indicator at an end of the first substring, and wherein the second substring includes an empty string.

11. The method of claim 9 wherein the first substring includes a first indicator, and wherein the second substring includes the first indicator.

12. The method of claim 9 wherein the first substring includes a second indicator at a start of the first substring, and wherein said second substring includes the second indicator.

13. The method of claim 12 wherein at least one of the first indicator and the second indicator is a regular pattern.

14. The method of claim 12 wherein the first indicator includes a SGML start tag and the second indicator includes a SGML end tag.

15. The method of claim 8 in which the finite state transducer is deterministic and in which the output string is a unique output string produced by applying the input string to the finite state transducer.

16. An article of manufacture for use in a system that includes a processor and a storage medium access device, the article comprising:

a storage medium for storing data; data stored on the storage medium being accessible by the processor through the storage medium access device; and a finite state data structure stored on the storage medium to which the processor can apply an input string to obtain an output string that is a modified version of the input string, a first substring in the input string being replaced by a second substring in the output string; the finite state data structure indicating a set of replaceable substrings that includes the first substring and indicating, for each replaceable substring, a replacement substring, the second substring being the replacement substring of the first substring; the input string being partitionable into any of two or more different substring series in accordance with the set of replaceable substrings; the finite state data structure partitioning the input string into a substring series that includes the first substring in accordance with a directionality constraint and a length constraint; the finite state data structure being derived to partition input strings only in accordance with the directionality constraint and the length constraint;

the directionality constraint requiring partition of the input string as if the set of replaceable substrings were compared with the input string by one of from-left-to-right and from-right-to-left; and the length constraint requiring partition of the input string as if, where two or more of the set of replaceable substrings could be matched, one of the matching replaceable substrings was selected for replacement, the selected substring being the longest or the shortest.

17. The article of claim 16 in which the finite state data structure is a finite state transducer.

18. The article of claim 17 in which the finite state transducer is deterministic and in which the output string is a unique output string produced by applying the input string to the finite state transducer.

19. A machine comprising:

a processor; and a finite state data structure to which the processor can apply an input string to obtain an output string that is a modified version of the input string, a first substring in the input string being replaced by a second substring in the output string; the finite state data structure indicating a set of replaceable substrings that includes the first substring and indicating, for each replaceable substring, a replacement substring, the second substring being the replacement substring of the first substring; the input string being partitionable into any of two or more different substring series in accordance with the set of replaceable substrings; the finite state data structure partitioning the input string into a substring series that includes the first substring in accordance with a directionality constraint and a length constraint; the finite state data structure being derived to partition input strings only in accordance with the directionality constraint and the length constraint;

the directionality constraint requiring partition of the input string as if the set of replaceable substrings were compared with the input string by one of from-left-to-right and from-right-to-left; and the length constraint requiring partition of the input string as if, where two or more of the set of replaceable substrings could be matched, one of the matching replaceable substrings was selected for replacement, the selected substring being the longest or the shortest.

20. The machine of claim 19 in which the finite state data structure is a deterministic finite state transducer and in which the output string is a unique output string produced by applying the input string to the finite state transducer.

* * * * *